INVENTOR.
William A. Ray
BY John Flam
ATTORNEY

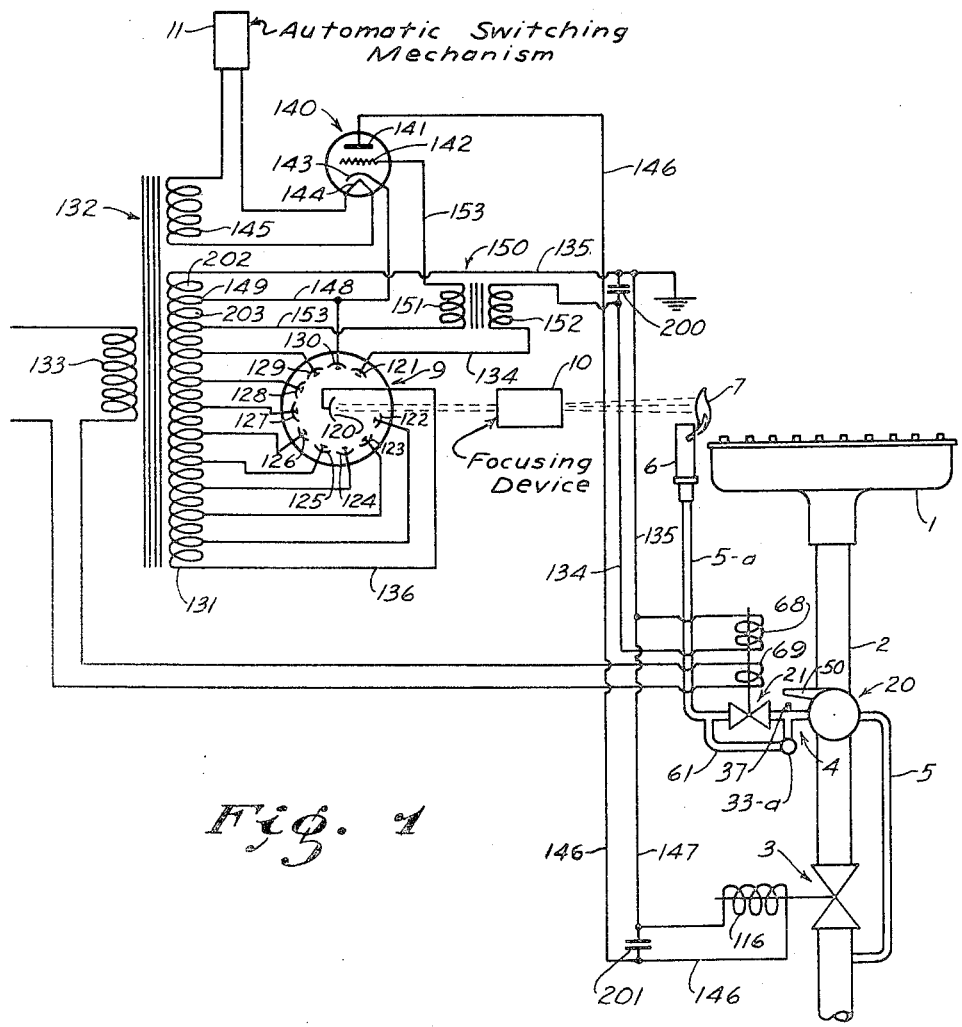

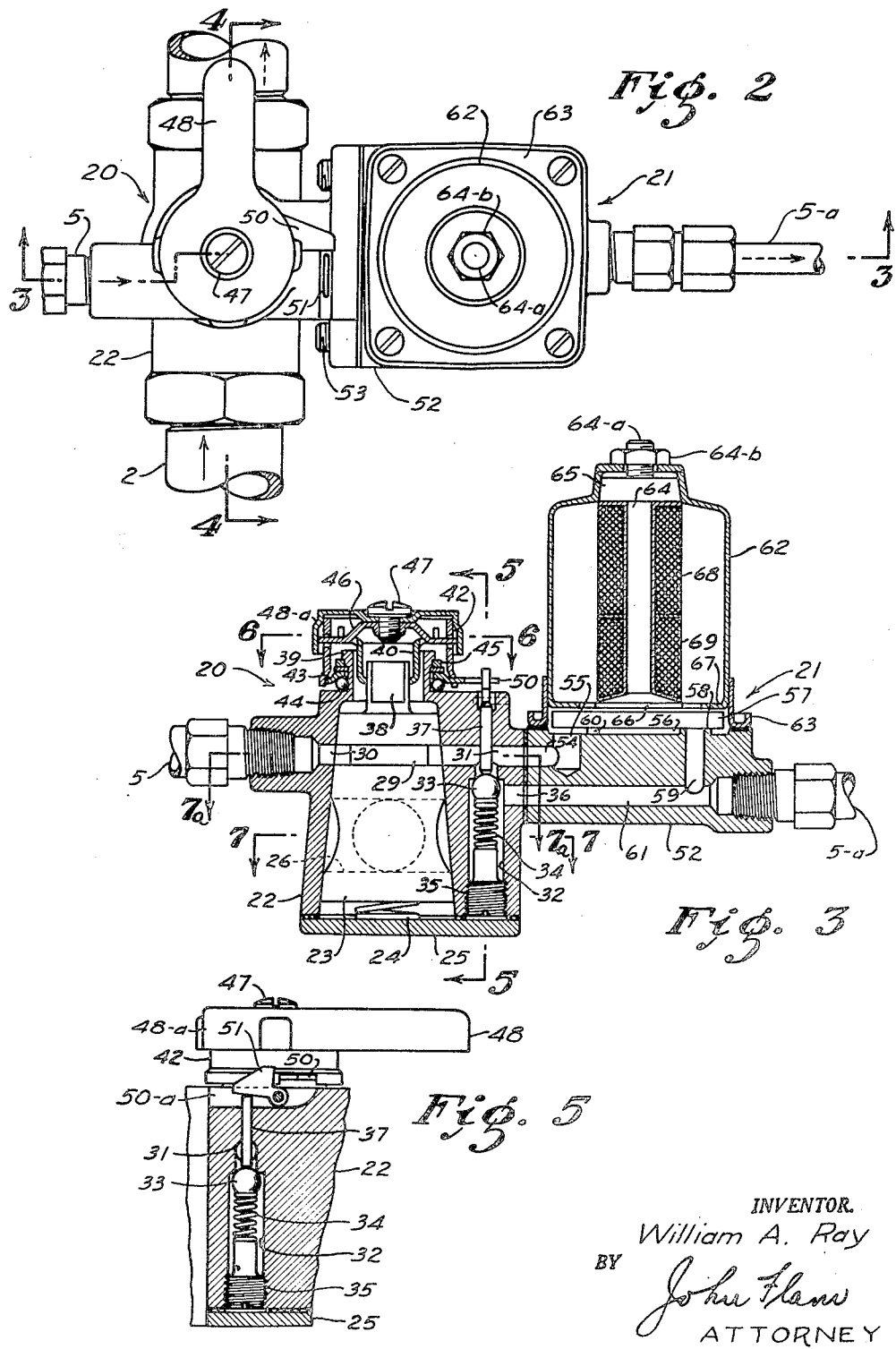
Nov. 14, 1950 — W. A. RAY — 2,529,740
SAFETY CONTROL SYSTEM FOR FLUID FUEL BURNERS
Filed Aug. 9, 1946 — 5 Sheets-Sheet 2
INVENTOR.
William A. Ray
BY John Flam
ATTORNEY

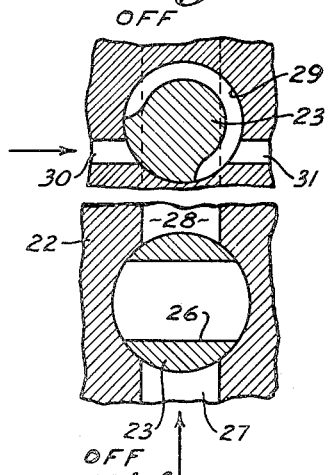
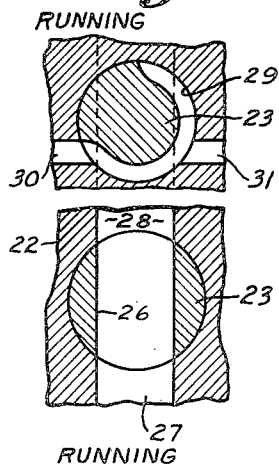
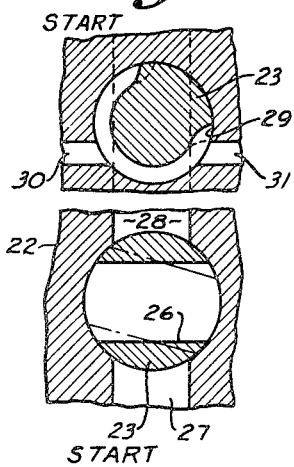
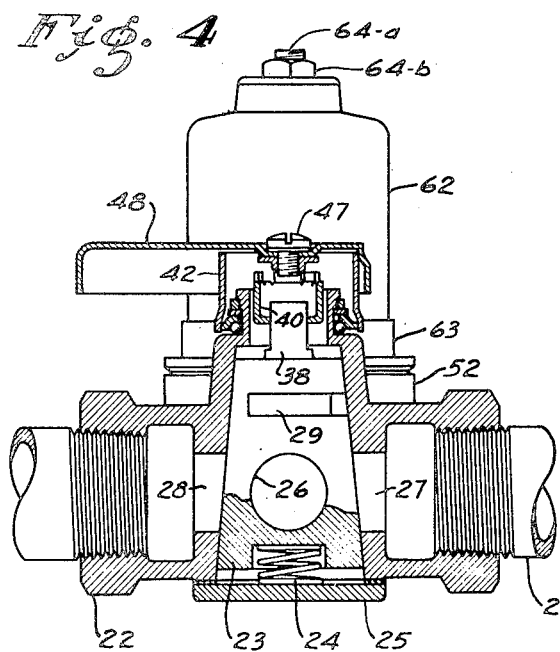
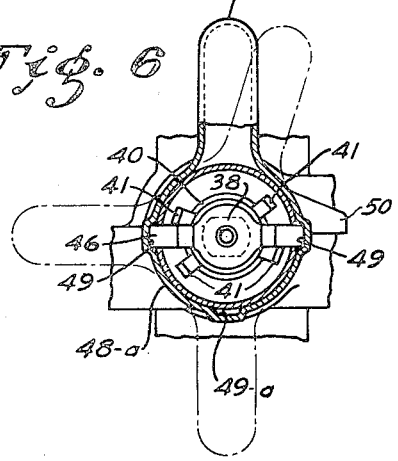

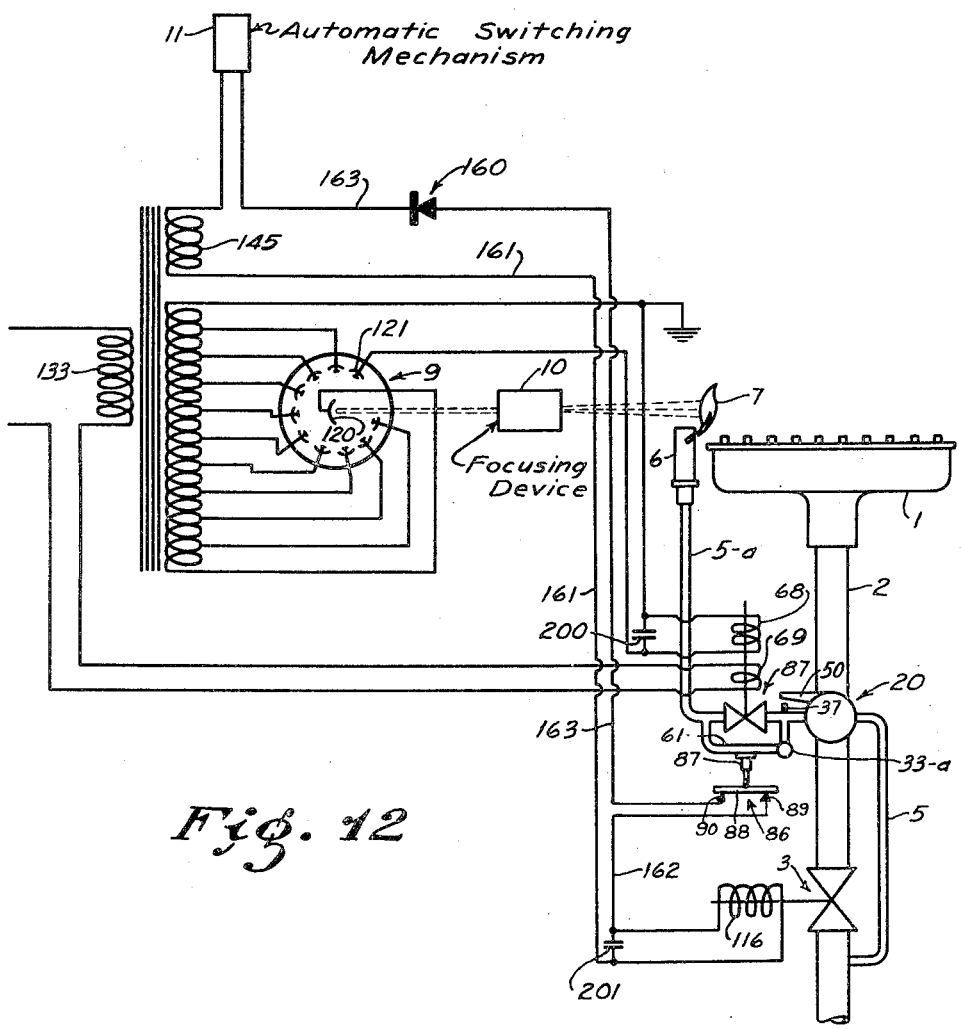

Patented Nov. 14, 1950

2,529,740

UNITED STATES PATENT OFFICE 2,529,740

SAFETY CONTROL SYSTEM FOR FLUID FUEL BURNERS

William A. Ray, Los Angeles, Calif., assignor to General Controls Co., a corporation of California Application August 9, 1946, Serial No. 689,425

20 Claims. (Cl. 158—117.1)

This invention relates to a system for controlling the supply of fluid fuel to a burner, and particularly to such a system ensuring against escape of unignited fuel.

In an application filed in the name of William A. Ray on June 8, 1944, under Serial No. 539,377, entitled "Fuel Supply System," now Patent No. 2,408,954, issued October 8, 1946, a fluid fuel control system is shown wherein the main control elements of the system are arranged to be energized, directly or indirectly, by a commercial source of electrical energy. Thus, upon failure of said source, the system is rendered inoperative, but the arrangement is such that mere resumption of the power supply suffices to return the system to operative condition.

Further, the system is arranged to ensure automatic interruption of the fuel supply upon failure of the pilot flame. For this purpose, a phototube of the electron multiplier type is provided, which tube is connected to be energized by the commercial source, the photocathode being illuminated by the pilot flame. Upon extinguishment of the pilot burner, the system can be returned to operation only by a manual valve resetting operation and reignition of the pilot flame.

It is an object of this invention to provide an improved system of this character.

It is another object of this invention to provide such a system which does not require a manual valve resetting operation to restore the system to operative condition.

It is another object of this invention to provide such a system in which the phototube furnishes rectified current for operating the pilot burner valve, a supplemental source of rectified current being provided for the main burner valve.

It is still another object of this invention to provide such a system having supplemental means responsive to the condition of the pilot burner valve for controlling the operation of the main valve.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

Figure 1 is a schematic diagram of a system incorporating the invention;

Fig. 2 is a plan view of a valve structure adapted for use in the system of Fig. 1;

Figs. 3 and 4 are sections taken as indicated by the correspondingly numbered lines on Fig. 2;

Figs. 5 and 6 are fragmentary sections, taken as indicated by the correspondingly numbered lines on Fig. 3;

Fig. 7 is a diagrammatic view taken as indicated by the lines 7—7 of Fig. 3;

Figs. 8 and 9 are diagrams similar to Fig. 7, showing different operating positions of the valve closure;

Figure 11:
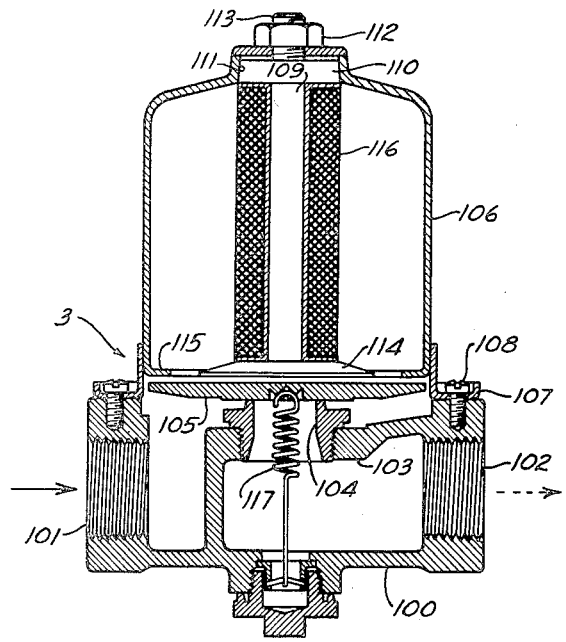
Figure 10:
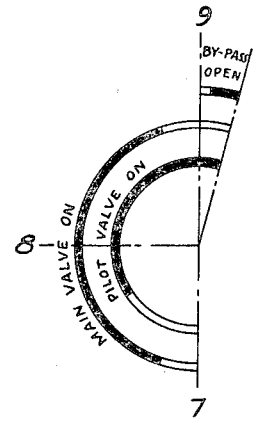

Figs. 7a, 8a, and 9a are diagrams illustrating various positions of the main valve closure corresponding to section line 7a—7a of Fig. 3;

Fig. 10 is a graph, useful in explaining the control functions of the valve of Fig. 2;

Fig. 11 is a transverse section of a valve which may be used for automatically controlling the main burner;

Fig. 12 is a diagram similar to Fig. 1, showing a modified form of system; and

Figure 13:
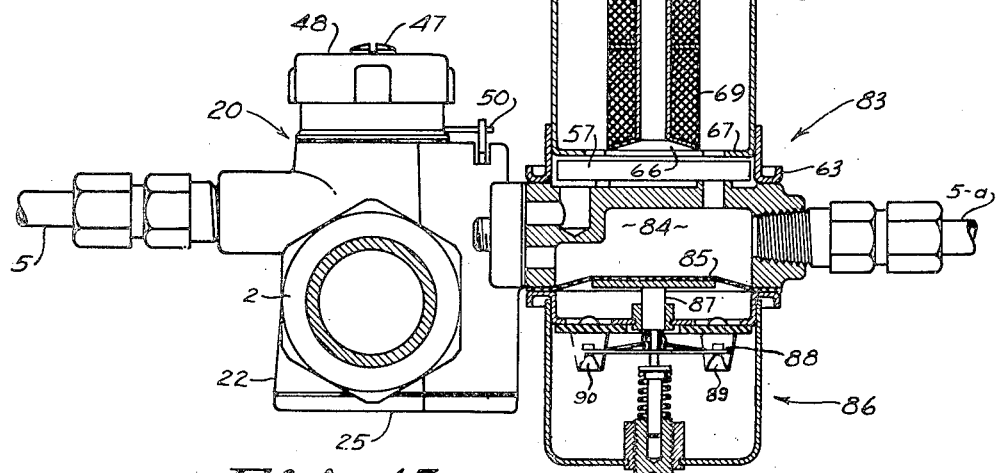

Fig. 13 is a view similar to Fig. 3 showing a modified form of valve adapted for use in the system of Fig. 12.

The system of the invention may be used for the control of liquid or gaseous fuels. Referring to Fig. 1, a system adapted for gaseous fuel is shown, having a main burner 1 supplied with fuel from an appropriate source by a pipe 2 controlled by a main valve 3 and a combination valve structure 4. The combination valve structure 4 supplementarily controls a conduit 5 for passing fuel to the pilot burner 6, which provides normally, a continuously burning flame 7 for igniting the main burner 1 when valves 3 and 4 are operated to pass fuel thereto. For this purpose the conduit 5 is connected to the fuel supply, so as to be independent of the valve 3, as by being connected to the conduit 2 between the source and the valve 3. In this way closing of the valve 3 has no effect on the fuel supply to the pilot burner 6. The main valve 3 is electrically operated, and the valve structure 4 includes a pilot burner valve 21, also electrically operated for controlling the fuel supply to the pilot burner 6.

Control circuits are provided respectively for the valves 3 and 21, which are responsive to the existence of the pilot flame 7. For this purpose these circuits include a light sensitive device, such as a phototube 9, arranged to respond solely to the light of the pilot flame 7. Light from other sources, including the main burner 1, may be excluded by suitable shields, or by appropriate location of the tube 9.

A focusing device 10 may be used to concentrate the light from the flame 7 onto the light sensitive element of the tube 9.

The circuit for the main valve 3 includes a condition responsive switch mechanism 11, which may be, for example, a conventional thermostat, responding to the temperature of a space to be heated by the burner 1. If the pilot flame 7 fails, the main valve 3, if open, closes immediately, and the pilot burner valve 21 also closes, assuming there has been no failure of the commercial current source. The combination valve 4 includes means for by-passing the pilot valve 21 to permit the pilot flame 7 to be re-established.

Upon re-establishment of the pilot flame 7, the pilot valve 21 opens and the main valve 3 may or may not open, as required by the condition responsive means 11. The combination valve 4 ensures against passage of fuel to the main burner until after the operation of lighting the pilot burner has been completed. This ensures the operator against possible injury by the substantially coincident ignition of the main burner and the pilot burner, which would occur if the means 11 were calling for heat at this time.

In the event of power failure, the main valve 3, if open, closes at once. The pilot burner valve 21, however, is arranged to remain open. In this way, the need of servicing each and every valve, such as 21, in the district where a power failure has occurred is avoided.

The combination valve 4 is shown in detail in Figs. 2 to 6 inclusive, and comprises a manually operable valve structure and an electro-magnetic valve structure, indicated generally by the numerals 20 and 21 in Fig. 2, the vertical arrows indicating the direction of flow through valve 20 and the horizontal arrows indicating the direction of flow through valve 21.

The valve structure 20 comprises a casing 22 having a tapered seat for a rotatable tapered plug 23, which is maintained seated by means of a spring 24 compressed between the bottom of the plug and a plate 25 covering the open bottom end of the casing. A main opening 26 extends diametrically through the lower portion of the plug 23 and is adapted, upon 90° rotation from the position of Figs. 3 and 4, to establish communication between the inlet and outlet openings 27 and 28 (Fig. 4). A groove 29 in the surface of the upper portion of the plug 23 serves to establish communication between the inlet and outlet passages 30 and 31 (Fig. 3).

The side wall of casing 22 has a vertical bore 32 leading downwardly from the outlet passage 31. The bore 32 is restricted, near its upper end, to form a downwardly facing seat for a valve ball 33, controlling communication between the passage 31, and another passage 36 leading from the bore 32. The valve ball 33 is urged to seat by a compression spring 34 confined between the ball 33 and an adjusting screw 35 threaded in the lower end of the bore 32. An actuating pin 37, closely guided in a relatively long opening through the top wall of the casing 22, rests on the ball 33.

The flattened stem 38 of the plug 23 extends into a tubular extension 39 formed on the top wall of the casing 22. Within this extension 39 is a cupped member 40 having its bottom wall apertured to fit the stem 38. Four spaced fingers 41 extend outwardly and upwardly from the mouth of the cup 40, as best shown in Fig. 6, the extension 39 being omitted for the sake of clarity.

A sleeve 42 is disposed about the extension 39, and has a flared bottom end to which a ball-race 43 is secured, as by welding. Balls 44, interposed between the race 43 and the top surface of casing 22 about the extension 39, provide a ball bearing support for the sleeve 42. The sleeve 42 is held in place on the extension 39 by a snap ring 45 which engages a shoulder on the extension.

A lost motion connection is provided between the sleeve 42 and the cup, or plug operating member 40, extending diametrically across the sleeve 42, the extremities of the arm 46 being received in conforming slots in the sleeve 42. The intermediate portions of the arm lie between the fingers 41 of the member 40 (see Fig. 6). A handle 48, having a cupped portion 48a fitting over the sleeve 42, is secured to the arm 46 as by a screw 47. The cupped portion 48a has a pair of projections providing opposed recesses 49 for receiving respectively the opposite ends of the arm 46, an additional recess 49a being provided to permit attachment of the handle 48 at a position 90° from that shown, if desired.

A lug 50 projects from the ball-race 43, and is adapted to cooperate with a lever 51 pivoted in a recess 50a in the casing 22 (see Fig. 5) and engaging the upper end of the pin 37. It will be apparent that the plug 23 can be rotated by manipulation of the handle 48; and, if the handle 48 is turned clockwise through a small angle from the full line position, as shown in Fig. 6, the valve ball 33 will be unseated. When the handle 48 is released, the spring 34 will seat the ball 33 and return the handle 48 to its full line position, due to the lost motion connection between the arm 46 and the fingers 41, and also due to the anti-friction mounting of the handle assembly.

The groove 29 extends only part way around the plug 23 and, as shown in Fig. 7, its angular relation to the plug passage 26 is such that, when the plug passage 26 extends transversely between the inlet and outlet 27 and 28 (Fig. 7a) so as to interrupt communication therebetween, communication between passages 30 and 31 also is interrupted. When the plug 23 is turned clockwise through an angle of 90° to the position of Fig. 8a, communication is established between passages 27 and 28, and between passages 30 and 31 (Fig. 8). When the plug 23 is rotated through an additional angle of 90° to the position of Fig. 9a, corresponding to that of Figs. 3 and 4, fluid can still pass between passages 30 and 31 (Fig. 9), but the main flow between inlet and outlet 27 and 28 is obstructed. When the plug is rotated through an additional small angle to unseat the valve ball 33, the conditions are as indicated by the broken lines in Fig. 9a, passages 30 and 31 still being in communication, while flow between passages 27 and 28 is still obstructed.

These various conditions of the valve plug 23 are illustrated graphically in Fig. 10, wherein the heavy lines bearing the legends "Main Valve On" and "Pilot Valve On" respectively indicate flow between the inlet 27 and the outlet 28, and from passage 30 to passage 31, while the legend "By-Pass Open" refers to the unseated condition of the valve ball 33. The straight dot-dash lines in Fig. 10 numbered 7, 8 and 9 correspond to the plug positions illustrated in the correspondingly numbered figures of the drawing; also, these lines correspond to the broken and solid line positions of the handle 48, as shown in Fig. 6. The dot-dash line to the right of line 9 corresponds to the position of the handle 48 when it is moved through a slight angle in the clockwise direction from the full-line position of Fig. 6 for opening the bypass 31.

The electromagnetic valve 21 (Fig. 3) comprises a casing 52 secured to the casing 22 of the plug valve 20 by screws 53 (Fig. 2) engaging flanged portions of the casings. An inlet passage 54, in register with passage 31, is provided in the casing 52, a branch passage 55 leading from passage 54 to a valve chamber 56 formed above the casing. A disc-shaped closure 57 of magnetizable material is accommodated in the chamber 56, and normally is supported at three points, viz., a valve seat 58 surrounding the outlet port 59, and a pair of pins one of which is shown at 60. By such an arrangement, generally disclosed in Patent No. 2,294,421 of September 1, 1942, only a small amount of power is required to effect an initial tilting of the closure 57 on its seat 58, the resultant relief of fluid pressure in the chamber 56 facilitating movement of the closure 57 to its fully open position. The port 59 leads to an outlet passage 61 which also is in communication with the passage 36 of plug valve 20.

On top of the casing 52 is an electromagnet structure, comprising an inverted cup-shaped magnetic shell 62 to which is welded a flanged supporting ring 63 (see also Fig. 2), secured to the casing 52 in a fluid-tight manner by screws passing through the flange and threaded into the casing. A central core 64 is secured to the shell 62, as by a threaded extension 64a extending through the top wall of the shell, and carrying a nut 64b engaging this wall. The core 64 has a tapered enlargement 65 providing a large surface in intimate contact between the core and the shell. The lower end of the core 64 is formed to provide a polar enlargement 66, the face of which is in the plane of the pole face formed by the underside of the inwardly turned flange 67 of the shell 62. The electromagnet is energized in accordance with the passage of current through windings 68 and 69, as will be discussed presently, and, when energized, attracts the closure 57 to open position against gravity and pressure, as previously pointed out.

A valve embodying the foregoing features is disclosed and claimed in a copending application in the name of William A. Ray, Serial No. 669,037, filed May 11, 1946. Furthermore, a valve operated by an electromagnet of this type has important advantages, among which is the capability of successful operation by a weak current. Such a valve is further disclosed and claimed in a copending application, Serial No. 671,583 filed May 22, 1946, in the name of William A. Ray.

In the system of Fig. 1, the combination valve 4 corresponds to the valve structure of Figs. 2–5, just described, the parts thereof being designated in Fig. 1 by the same reference numerals, the part indicated by 33a representing the complete valve constituted by the ball 33. The other parts indicated in Fig. 1 are the plug valve 20, the electromagnetic valve 21, coils 68 and 69 of valve 21, pin 37 for actuating valve 33a, handle lug 50 for cooperating with pin 37, and passage 61 by passing valve 21. The lower section of the plug valve 20 (controlled by the plug opening 26) is connected in series in the conduit 2, which passes fuel to the main burner 1 when the valve 3 is open. This main valve 3 is of the electromagnetic type, similar to valve 21 but of greater flow capacity and is shown in Fig. 11.

Referring to Fig. 11, the valve 3 is of a type disclosed and claimed in the above mentioned copending application Serial No. 671,583, filed May 22, 1946, and comprises a body 100 having an inlet 101 and an outlet 102. A ported wall 103 is provided between the inlet and the outlet and carries a valve seat 104 with which a disc-like closure member 105 of magnetizable material cooperates to control fluid flow through the body 100. On top of the body 100 is an electromagnet structure comprising an inverted cup-shaped magnetic shell 106 to which is welded a flanged supporting ring 107 secured to the body 100 in a fluid-tight manner by screws 108 passing through the flange and threadedly engaging the body. A central core 109 has a tapered circular head 110 secured in a corresponding recess 111 provided in the top wall of the shell 106, by means of a nut 112, engaging a threaded extension 113 of the core which passes through the said top wall.

The lower end of the core 109 is formed with a polar enlargement 114, having its face in the plane of the pole face formed by the underside of the inwardly turned flange 115 of the shell 106. A winding 116 on the core 109 serves to energize the core 109 in response to passage of current, and causes the core 109 to raise the closure 105 from seat 104 against the force of spring 117 to permit fluid through the valve. This winding 116 is a direct current winding. Upon cessation of the current in winding 116, the closure 105 is at once released and returns to closed position in response to the spring 117. The large polar areas and small air gap provided by the valve ensure its successful operation by a very small current.

The pilot burner conduit 5 (Figs. 1 and 3) leads from the main conduit 2 to the inlet passage 30 of the upper section of the plug valve 20, the outlet passage 31 being connected directly to the inlet 54 of the electromagnetic valve 21. A continuation 5a of the pilot burner conduit leads to the pilot burner 6 from the outlet passage 61 of the valve 21.

In the present instance, a phototube 9 is arranged to respond to the existence of the pilot flame 7 to supply current for operating the electromagnetic valve 21. This tube 9 serves not only as a control for the valve, but additionally to supply unidirectional current for the winding 68. This current is pulsating; and, accordingly a condenser 200 may be connected across the winding 68.

To ensure sufficient current for operating the valve 21 in response to the slight illumination provided by the pilot flame 7, the phototube 9 is of the electron multiplier type, such, for example, as that type known commercially as the 931a. The tube 9 includes a photo-sensitive cathode 120 which emits electrons when its active surface is illuminated, as by the flame 7. The anode 121 finally receives the electrons produced in the tube by successive action of the electrons upon a number of secondary emitters, or auxiliary electrodes, 122, 123, 124, 125, 126, 127, 128, 129, and 130, subjected to successively increased potential by being connected to taps on the secondary winding 131 of a step-up transformer 132. The primary winding 133 may be connected to a commercial alternating current source. The operation of such a tube is well known and will not be discussed here.

The output current between the anode 121 and the auxiliary anode 130 is unidirectional and is supplied to coil 68 of the electromagnetic valve 21 for operating the valve. Thus, the anode 121 is connected by a conductor 134 to one terminal of winding 68, the other terminal being joined by a conductor 135 to the upper terminal of the secondary 131. The circuit includes section 202, conductor 148, and auxiliary anode 130. A winding 152 is included in conductor 134 for providing an electric interlock system which will be described in detail hereinafter.

This circuit and coil 68 are energized, maintaining the valve 21 open, as long as the cathode 120 is illuminated by the pilot flame 7. Upon failure of the pilot flame 7, and assuming there has been no failure of the commercial power supply, the valve 21 closes and, upon reestablishment of the pilot flame, the valve 21 reopens. However, the arrangement is such that, upon failure of the power supply, the valve 21 remains open. For this purpose the supplemental winding 69 is provided on the core 64, and is connected to the alternating current source, as by being connected in series with the transformer primary 133.

The winding 69 is arranged to produce a magnetomotive force which is just sufficient to neutralize the magnetic remanence of core 64 when the winding 68 is de-energized. By appropriate design and choice of material for the core 64, this remanence is such as to retain the valve closure or armature 57 of valve 21 in attracted position, even when the winding 68 is de-energized. Accordingly, for the closure 57 to be released, the winding 69 must be energized to neutralize the remanence. A system arranged to maintain the pilot burner valve open in this way upon power failure is disclosed in a copending application, Serial No. 539,377, filed June 8, 1944, in the name of William A. Ray, now become Patent No. 2,408,954, granted October 8, 1946.

Winding 116 for operating the valve 3 is energized by rectified alternating current that is rendered effective only while the pilot light 7 is in existence, and phototube 9 is active. This is effected by the aid of the electronic emission device or audion 140. This device has an anode 141 and a cathode 143 provided with a heater 144. This heater is energized from a secondary winding 145 forming a part of the transformer 132. The automatic switch mechanism 11, such as a thermostat, is connected in series with the heater 144. In this way, it is only when the automatic switch mechanism demands more heat that the heater 144 is energized.

The device 140 also includes the control or grid electrode 142.

Any two adjacent sections of the secondary 131, such as the sections 202 and 203, may be used for providing the required potential differences for the electrodes of the device 140. Thus, for example, the lower terminal of section 203 is connected to the control electrode 142 through a winding 151 of transformer 150, and a conductor 153. The cathode 143 is connected to the junction 149 between these two sections by the aid of the conductor 148. The anode 141 is connected through a conductor 146, winding 116, and conductors 147 and 135 to the upper terminal of section 202. Since the current supplied to winding 116 is pulsating, a condenser 201 may be connected across the winding.

First, assuming that the transformer 150 is inactive, no current can flow through winding 116. This is apparent from the following considerations. Thus, when the upper terminal of section 202 is positive as the current alternates through the secondary winding 131, the grid or control electrode 142 is then negative with respect to the cathode 143, and, accordingly, the space current is reduced to zero. On the other hand, when the upper terminal of section 202 is negative, then the anode 141 is likewise negative with respect to the cathode 143 and, again, no space current can flow.

However, when there is a flame 7 at the pilot burner 6 a pulsating current flows through the winding 152 of transformer 150, since this coil 152 is in series with the phototube 9. Accordingly, this pulsating current sets up alternately negative and positive potentials on grid 142. The connection is such that, when the anode 141 is positive, the grid 142 becomes positive, and then space current is permitted to flow in the audion 140. The winding 116 is then energized by a pulsating current. It is apparent that energization of winding 116 depends upon illumination of the cathode 120 of the phototube 9. Accordingly, the energization of winding 116 depends upon two factors: the condition of automatic switch 11 and the condition of the phototube 9.

In the event of power failure, the coil 69 is not energized, and therefore the remanence of core 64 retains the closure 57 in attracted position, assuming the closure already was in that position. On the other hand, the main valve 3 closes, since the winding 116 is de-energized.

Normally without power failure, the pilot burner valve 21 is maintained open only while the pilot flame 7 is in existence. Upon extinguishment of the flame 7, the phototube 9 becomes inactive. This causes the tube 140 to become nonconducting, de-energizing coil 116 and causing the main valve 3 to close. At the same time, coil 68 is de-energized, and, since coil 69 neutralizes the magnetic remanence in core 64, valve 21 also closes.

In Fig. 1, the plug valve 20 is in the condition shown in Figs. 2–6 and 9, the handle lug 50 being adjacent the pin 37. Since the pilot flame 7 is burning, coil 68 is energized and valve 21 is open. The main valve 3 may be either open or closed, depending on the requirements of the automatic switch 11. However, no fuel can pass at this time to the main burner 1, since the plug passage 26 is in flow-preventing position. To establish normal operation of the system, the valve plug 23 is turned counterclockwise through 90° to the open position of Fig. 8a. The main valve 3 then automatically controls fuel flow to the main burner 1 in accordance with the requirements of the automatic switch 11. If it is desired completely to discontinue operation of the system, plug 23 is turned to the position of Fig. 7a so that flow through both sections of the valve 20 is prevented. Due to the extinguishment of the pilot flame 7, the phototube 9 is no longer capable of passing current and the valves 3 and 21 accordingly both close, ensuring positive 100% shut-off of the fuel.

If the pilot flame 7 is extinguished during normal operation of the system with the plug 23 in the position of Fig. 8a, the valves 3 and 21 both close as previously described. To light the pilot burner 6 and thereby restore the system to operation, the plug 23 is rotated to the position of Fig. 9a, and slightly beyond, to cause the handle lug 50 to open the by-pass valve 33a. Fuel flow to the main burner 1 is obstructed at this time by the plug 23 being in the flow-preventing position indicated by the broken lines in Fig. 9a, and also by the main valve 3 which is closed due to the fact that the winding 116 is not energized.

Upon ignition of the pilot flame, the phototube 9 passes current to energize coil 68 and causes the pilot valve 21 to open, this opening being evidenced by an audible click. Thereupon, the plug valve handle 48 is released and returns under the force of the bias spring of valve 33' to the solid line position of Fig. 6. This allows valve 33a to close and places control of the fuel flow to the pilot burner 6 under the valve 21. If normal operation of the system is then desired, the plug 23 is rotated back to the position of Fig. 8a.

A system having a slightly different mode of operation, and employing for this purpose a modified form of combination valve, is shown in Fig. 12, the valve being shown in Fig. 13. Referring to Fig. 13, the modified combination valve comprises a plug valve 20 identical with that employed in the previously described valve of Figs. 2–6, and an electromagnetic valve 83 similar to valve 21 except that the outlet passage is enlarged to provide a chamber 84, the bottom wall of which is formed by a flexible diaphragm 85. This diaphragm 85 is clamped at its margin to the valve casing by a switching device generally indicated by 86.

Inasmuch as this switching device 86 is of conventional construction and forms, per se, no part of the present invention, it suffices to state that, when the actuating button 87 is moved downwardly by gas pressure in chamber 84 acting on the diaphragm 85, a bridging element 88 is brought into engagement with contacts 89, and 90 and, when the pressure is released, a reverse action occurs.

Referring to Fig. 12, the system is quite similar to the system of Fig. 1, comprising a main burner 1, the supply of fuel to which is controlled by the plug valve 20 and an electromagnetic valve 3 with an operating winding 116. The flame 7 of the pilot burner 6 serves to illuminate the cathode 120 of the phototube 9 to cause the tube 9 to pass current, the winding 68 of the pilot burner valve 83 being connected between the anode 121 and the anode 130 so as to be energized and de-energized in accordance with the existence or non-existence of the pilot flame, and thus operate the valve 83.

In this form of the invention, the circuit for energizing the main valve winding 116 includes a conventional rectifier 160, which may be a tube or oxide type energized by the transformer secondary 145 and controlled by the automatic switch 11, and the switch 86 operated in response to passage of fuel to the pilot burner 6. Thus, a conductor 161 leads from the lower terminal of the secondary 145 to one terminal of the winding 116; a conductor 162 leads from the other terminal of winding 116 to one of the switch contacts as 89; a conductor 163 leading from the other contact 90 to the upper terminal of the secondary 145 through the rectifier 160 and the automatic switch 11.

With the plug 23 of valve 20 positioned to pass fuel to the main burner 1 and to the pilot burner 6, and with the pilot flame 7 burning, the phototube 9 delivers unidirectional current to winding 68, maintaining the pilot valve 83 in open position, the pressure of the fuel passing to the pilot burner through chamber 84 maintaining the switch 86 closed. Thus, the coil 116 is energized and de-energized in accordance with the dictates of the automatic switch 11 to cause the main valve 3 to open and close.

Upon extinguishment of the pilot flame 7, the phototube 9 ceases to deliver current to the winding 68, thus causing the pilot valve 83 to close and relieving the fluid pressure in the chamber 84. This, in turn, allows the switch 86 to open, so that the main valve 3, if open, is caused to close or is prevented from opening.

The system of Fig. 12 is restored to normal operation in the same manner as that of Fig. 1; that is, the handle 48 of the plug valve 20 is operated to position the plug 23 to prevent passage of fuel to the main burner 1, and to cause the valve 33a to by-pass valve 83 and pass fuel to the pilot burner 6. Upon establishment of the flame 7, the phototube 9 energizes the coil 68, which opens the valve 83 with the previously mentioned click. Thereafter the plug 23 is returned to fuel passing position and the control of the main burner 1 restored to the main valve 3 and the automatic switch 11.

As before, the pilot valve 83 is arranged to be held open by the magnetic remanence in core 64, unless the remanence is neutralized by current flow from the power source in the winding 69. Thus, upon power failure, the pilot valve 83 remains open regardless of the pilot flame 7, but the main valve 3 is caused to close or to remain closed, since there is no current flow in the transformer secondary 145.

The inventor claims:

1. In a fluid fuel control system: a main burner; an electrically operated main valve for controlling fuel flow to the main burner; a pilot burner; an electrically operated pilot burner valve for controlling fuel flow to the pilot burner; a photoelectric tube having a photo-sensitive cathode and adapted to be energized by an alternating current supply for rectifying the alternating current and supplying unidirectional current for operating said pilot burner valve, the flame of the pilot burner activating said cathode; supplementary means for supplying current to operate the main valve; and control means energizable by the current operating the pilot burner valve, and when energized to control said supplementary means to pass current to operate said main valve.

2. In a fluid fuel control system: a main burner; an electrically operated main valve for controlling fuel flow to the main burner; a pilot burner; an electrically operated pilot burner valve for controlling fuel flow to the pilot burner; means responsive to the existence of a pilot flame for supplying current to operate said pilot burner valve; means for supplying current to operate the main valve; and means responsive to the current supply to the pilot burner valve for controlling operation of the main valve.

3. In a fluid fuel control system: a main burner; a pilot burner for producing a pilot flame; an electrically operated main valve for controlling fuel flow to the main burner; an electrically operated pilot burner valve for controlling fuel flow to the pilot burner, having a magnetic member and a winding for magnetizing said member; an electronic emission device energizable from a source of alternating current, said device serving to rectify the alternating current, and supplying the resultant unidirectional current to said winding for holding the pilot burner valve open only while the pilot flame is in existence, the remanence of said magnetic member being sufficient to maintain said pilot burner valve open after said winding is deenergized; a demagnetizing winding for the magnetic member, energized from said alternating current source, said demagnetizing winding operating to render said remanence ineffective while the source of alternating current is active; means for supplying current to operate the main valve; and control means energizable by the current from said electronic emission device and when energized, to control said current supply means to pass current to said main valve.

4. In a fluid fuel control system: a main burner; a pilot burner for producing a pilot flame; an electrically operated main valve for controlling fuel flow to the main burner; an electrically operated pilot burner valve for controlling fuel flow to the pilot burner, having a magnetic member and a winding for magnetizing said member; an electronic emission device energizable from a source of alternating current, said device serving to rectify the alternating current and supplying the resultant unidirectional current to said winding for holding the pilot burner valve open only while the pilot flame is in existence, the remanence of said magnetic member being sufficient to maintain said pilot burner valve open after said winding is deenergized; a demagnetizing winding for the magnetic member, energized from said alternating current source, said demagnetizing winding operating to render said remanence ineffective while the source of alternating current is active; supplemental means energizable from said source of alternating current, said means serving to rectify said alternating current and supplying the resultant unidirectional current to operate the main valve; and control means energizable by the current from said electronic emission device and when energized, to control said supplemental means to pass current to said main valve.

5. In a fluid fuel control system: a main burner; a pilot burner for producing a pilot flame; an electrically operated main valve for controlling fuel flow to the main burner; an electrically operated pilot burner valve for controlling fuel flow to the pilot burner, having a magnetic member and a winding for magnetizing said member; a photo-electric tube having a photo-sensitive cathode affected by the pilot flame, said tube being energizable from a source of alternating current, said tube serving to rectify the alternating current and supplying the resultant unidirectional current to said winding for holding the pilot burner valve open only while the pilot flame is in existence, the remanence of said magnetic member being sufficient to maintain said pilot burner valve open after said winding is deenergized; a demagnetizing winding for the magnetic member, energized from said alternating current source, said demagnetizing winding operating to render said remanence ineffective while the source of alternating current is active; means for supplying current to operate the main valve; and control means energizable by the current from said tube, and when energized, to control said current supply means to pass current to said main valve.

6. In a fluid fuel control system: a main burner; a pilot burner for producing a pilot flame; an electrically operated main valve for controlling fuel flow to the main burner; an electrically operated pilot burner valve for controlling fuel flow to the pilot burner, having a magnetic member and a winding for magnetizing said member; an electronic emission device energizable from a source of alternating current, said device serving to rectify the alternating current and supplying the resultant unidirectional current to said winding for holding the pilot burner valve open only while the pilot flame is in existence, the remanence of said magnetic member being sufficient to maintain said pilot burner valve open after said winding is deenergized; a demagnetizing winding for the magnetic member, energized from said alternating current source, said demagnetizing winding operating to render said remanence ineffective while the source of alternating current is active; means for supplying current to operate the main valve; control means energizable by the current from said electronic emission device and when energized, to control said current supply means to pass current to said main valve, and condition responsive means cooperating with said control means also to control said current supply means.

7. In a fluid fuel control system: a main burner; a pilot burner for producing a pilot flame; an electrically operated main valve for controlling fuel flow to the main burner; an electrically operated pilot burner valve for controlling fuel flow to the pilot burner, having a magnetic member and a winding for magnetizing said member; a photo-electric tube having a photo-sensitive cathode affected by the pilot flame, said tube being energizable from a source of alternating current, said tube serving to rectify the alternating current and supplying the resultant unidirectional current to said winding for holding the pilot burner valve open only while the pilot flame is in existence, the remanence of said magnetic member being sufficient to maintain said pilot burner valve open after said winding is deenergized; a demagnetizing winding for the magnetic member, energized from said alternating current source, said demagnetizing winding operating to render said remanence ineffective while the source of alternating current is active; means for supplying current to operate the main valve; control means energizable by the current from said tube, and when energized, to control said current supply means to pass current to said main valve, and condition responsive means cooperating with said control means also to control said current supply means.

8. In a fluid fuel control system: a main burner; an electrically operated main valve for controlling fuel flow to the main burner; a pilot burner; an electrically operated pilot burner valve for controlling fuel flow to the pilot burner; a normally closed bypass valve for passing fuel to the pilot burner and independently of the electromagnetically operated pilot burner valve; means for temporarily opening said bypass valve; means responsive to the existence of a pilot flame for supplying current to operate the pilot burner valve; a grid controlled rectifier connected to a source of alternating current for supplying unidirectional current to operate the main valve; means for applying a biasing potential on said grid from said source to prevent current flow through the rectifier; and means including a pair of inductively coupled coils and responsive to current flow to the pilot burner valve for altering said biasing potential to control said rectifier to pass current.

9. In a fluid fuel control system: a main burner; an electrically operated main valve for controlling fuel flow to the main burner; a pilot burner; an electrically operated pilot burner valve for controlling fuel flow to the pilot burner;

switch means operated in response to the pressure of the fuel flowing to the pilot burner; means responsive to the existence of a pilot flame for supplying current to operate the pilot burner valve; manually operable means optionally to by-pass said pilot burner valve, and circuit forming means, including said switch means, for operating the main valve to open in response to fuel flow to the pilot burner.

10. In a fluid fuel control system: a main burner; an electrically operated main valve for controlling fuel flow to the main burner; a pilot burner; an electrically operated pilot burner valve for controlling fuel flow to the pilot burner; a normally closed bypass valve for passing fuel to the pilot burner and independently of the electromagnetically operated pilot burner valve; means for temporarily opening said bypass valve; means responsive to the existence of a pilot flame for supplying current to operate the pilot burner valve; a grid controlled rectifier connected to a source of alternating current for supplying unidirectional current to operate the main valve; means controlling said source for applying a biasing potential on said grid to prevent current flow through the rectifier; means including a pair of inductively coupled coils and responsive to current flow to the pilot burner valve for altering said biasing potential to control said rectifier to pass current, and condition responsive means for supplementarily controlling said rectifier.

11. In a fluid fuel control system: a main burner; an electrically operated main valve for controlling fuel flow to the main burner; a pilot burner; an electrically operated pilot burner valve for controlling fuel flow to the pilot burner; switch means operated in response to fuel flow to the pilot burner; means responsive to the existence of a pilot flame for supplying current to operate the pilot burner valve, manually operable means optionally to by-pass said pilot burner valve; circuit forming means, including said switch means, for operating the main valve to open in response to fuel flow to the pilot burner, and condition responsive means cooperating with said switch means to control the operation of the main burner.

12. In a fluid fuel control system: a main burner; a pilot burner for providing a pilot flame; a main burner valve and a pilot burner valve for respectively controlling fuel flow to said burners, each of said valves being electrically operated; a photo-electric tube having a photosensitive cathode and energizable from a source of alternating current, said tube serving to rectify the alternating current and supply the resultant unidirectional current to operate the pilot valve, said pilot flame activating the cathode for controlling the flow of said unidirectional current; manually operable means optionally to by-pass said pilot burner valve; means forming a supplementary source of unidirectional current for operating the main valve; and control means operated by current from said tube for controlling said supplementary source to supply current to operate the main valve.

13. In a fluid fuel control system: a main burner; a pilot burner; an electromagnetically operated valve for supplying fuel to the pilot burner; means providing a passage of fuel to said pilot burner independently of said valve; means responsive to the igniting of the pilot burner for energizing said electromagnetically operated valve to cause the valve to open; said valve being capable of remaining open due to magnetic remanence; and alternating current means for substantially neutralizing said remanence.

14. In a fluid fuel control system: a main burner; a pilot burner; an electromagnetically operated valve for supplying fuel to the pilot burner; means providing a passage of fuel to said pilot burner independently of said valve; means responsive to the igniting of the pilot burner for energizing said electromagnetically operated valve to cause the valve to open; said means including a source of alternating current and a rectifier; said valve being capable of remaining open due to magnetic remanence; and means operated from said source for substantially neutralizing said remanence.

15. In a fluid fuel control system: a main burner; a pilot burner; an electrically energizable valve mechanism for the main burner; and means for operating said valve mechanism comprising an electronic emission device having a cathode, a control electrode and an anode, said control electrode and anode being connectible across a source of alternating current, and the cathode being connectible to the source to impress a potential on the cathode of a valve intermediate the potentials of the control electrode and anode; and means responsive to the existence of the pilot flame for supplementarily affecting the potential of the control electrode to provide a positive potential for said control electrode, the valve mechanism being energizable to open it by aid of current through said device.

16. In a fluid fuel control system: a main burner; a pilot burner; an electrically energizable valve mechanism for the main burner; and means for operating said valve mechanism comprising an electronic emission device having a cathode, a control electrode and an anode, said control electrode and anode being connectible across a source of alternating current, and the cathode being connectible to the source to impress a potential on the cathode of a valve intermediate the potentials of the control electrode and anode; means responsive to the existence of the pilot flame for supplementarily affecting the potential of the control electrode to provide a positive potential for said control electrode, the valve mechanism being energizable to open it by aid of current through said device; and condition responsive means for activating said cathode.

17. In a fluid fuel control system: a main burner; a pilot burner; an electrically operated valve for the main burner; an electrically operated valve for the pilot burner; means, independent of the pilot burner valve, for temporarily passing fuel to the pilot burner; means responsive to the existence of the pilot flame for energizing the pilot burner valve; rectifier means connectible to a source of alternating current for supplying energy to said main burner valve; and means operating in response to the energization of the pilot burner valve for controlling said rectifier means to pass current to the main burner valve.

18. In a fluid fuel control system: a main burner; a pilot burner; an electrically operated valve for the main burner; an electrically operated valve for the pilot burner; means responsive to the existence of the pilot flame for energizing the pilot burner valve; manually operable means optionally to bypass said pilot burner valve; rectifier means connectible to a source of alternating current for supplying energy to said main burner valve; and means operating in response to the energization of the pilot burner valve for controlling said rectifier means to pass current to the main burner valve.

19. In a fluid fuel control system: a main burner; a pilot burner; an electrically operated valve for the main burner; an electrically operated valve for the pilot burner; a pair of rectifiers connectible to a source of alternating current; means for energizing one of said rectifiers to operate the pilot burner valve in response to the existence of the pilot flame; manually operable means optionally to bypass said pilot burner valve and means, operating in response to the passage of current through said one rectifier, for controlling the other rectifier to operate the main burner valve.

20. In a fluid fuel control system; a main burner; a pilot burner; an electrically operated valve for the main burner; an electrically operated valve for the pilot burner; a pair of rectifiers connectible to a source of alternating current; means for energizing one of said rectifiers to operate the pilot burner valve in response to the existence of the pilot flame; manually operable means optionally to bypass said pilot burner valve; means, operating in response to the passage of current through said one rectifier, for controlling the other rectifier to the main burner valve; and condition responsive means for activating said other rectifier.

WILLIAM A. RAY.

REFERENCES CITED

The following references are of record in the file of this patent:

UNITED STATES PATENTS

| Number | Name | Date |
|---|---|---|
| 1,809,280 | Knowles | June 9, 1931 |
| 1,880,871 | Denison | Oct. 4, 1932 |
| 2,274,384 | Scanlan | Feb. 24, 1942 |
| 2,290,775 | Snyder | July 21, 1942 |
| 2,304,641 | Jones | Dec. 8, 1942 |
| 2,408,954 | Ray | Oct. 8, 1946 |